3,652,495
STABILIZATION OF RELATIVELY SATURATED POLYMERS WITH PHENOLIC STABILIZERS AND SULFUR-CONTAINING COMPOUNDS
Paul R. Dean II, Akron, Ohio, assignor to The Goodyear Tire & Rubber Company, Akron, Ohio
No Drawing. Continuation of application Ser. No. 643,044, June 21, 1967. This application Jan. 13, 1970, Ser. No. 1,986
Int. Cl. C08d 11/04; C08f 45/58
U.S. Cl. 260—45.85
20 Claims

ABSTRACT OF THE DISCLOSURE

A stabilization system comprising an alkylated phenol and sulfur-containing compounds and polymers, including polystyrene, modified polystyrene, polypropylene and polyethylene polymers, having said stabilization system incorporated therein.

---

This application is a continuation application of patent application Ser. No. 643,044 filed June 2, 1967, and now abandoned.

This invention relates to a stabilization system and to relatively saturated polymer compositions including polystyrene, modified polystyrene and polymers of α-olefins having 2 to 8 carbon atoms in the molecule containing the stabilization system and possessing resistance to oxygen degradation. More particularly it relates to polystyrene, modified polystyrene, polyethylene and polypropylene stabilized against oxidative degradation with low levels of an alkylated phenol and sulfur-containing compounds.

It has been known for some time that certain phenolic materials may be used to stabilize conventional rubbers such as butadiene-styrene copolymers, natural rubber, etc. against oxidation degradation. However, it has normally been necessary to use levels in the range of about 0.75 to about 2.00 parts of the antioxidant per 100 parts by weight of the rubber. In recent years it has been discovered that some of these phenolic antioxidants may be used as stabilizers for relatively saturated polymers such as polyolefins and polystyrene.

It has also been discovered that the stabilizer level necessary to effectively protect such polymers is significantly less than that required to effectively protect conventional rubbers such as butadiene-styrene copolymers and natural rubber. It has been reasoned that this is due to the greater degree of unsaturation possessed by the latter polymers, said unsaturation resulting in a greater susceptibility to deterioration. For example, a level of about 0.25 part of phenolic antioxidant per 100 parts by weight of polypropylene is normally required to effectively stabilize the polymer. It would be desirable to use even lower levels of these relatively expensive antioxidants and at the same time effectively stabilize the polyolefins against oxidation degradation.

It is an object of this invention to provide relatively saturated polymers possessing resistance to oxidation degradation. It is a further object of this invention to provide polyolefins and polystyrene containing very low amounts of a relatively non-discoloring phenolic stabilizer and possessing adequate resistance to oxidation degradation.

In accordance with the present invention relatively saturated polymers, including polymers selected from the group consisting of polymers of α-olefins having 2 to 8 carbon atoms in the molecule and modified polystyrene are effectively stabilized by incorporating therein an alkylated reaction product wherein said product is formed by first reacting dicyclopentadiene with a phenol selected from the group consisting of phenol, p-cresol, o-cresol, mixed m,p-cresol and p-ethyl phenol to form a phenolic compound, and then alkylating the phenolic compound with a tertiary olefin selected from the group consisting of isobutylene, tertiary amylenes and tertiary hexylenes, in combination with a sulfur-containing compound conforming to the following structural formula:

wherein R is selected from the group consisting of hydrogen, alkyl radicals containing from 1 to 20 carbon atoms, cycloalkyl radicals containing from 5 to 8 carbon atoms, aryl radicals containing from 6 to 24 carbon atoms and a radical conforming to the following structural formula:

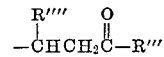

wherein R″ and R″″ are selected from the group consisting of hydrogen, alkyl radicals containing from 1 to 20 carbon atoms, cycloalkyl radicals containing from 5 to 8 carbon atoms, aryl radicals containing from 6 to 24 carbon atoms, R′ and R‴ are selected from the group consisting of hydrogen, alkyl radicals containing from 1 to 20 carbon atoms, cycloalkyl radicals containing from 5 to 8 carbon atoms, aryl radicals containing from 6 to 24 carbon atoms, alkoxy radicals containing from 1 to 20 carbon atoms, cycloalkoxy radicals containing from 5 to 8 carbon atoms and aryloxy radicals containing from 6 to 24 carbon atoms and wherein $n$ is a whole number less than 3.

Preferred alkylated reaction products are formed by (1) reacting in the presence of a Friedel-Craft type catalyst one mol of dicyclopentadiene and at least one mol of a phenolic mateial selected from the group consisting of phenol, p-cresol, o-cresol, mixed m,p-cresol and p-ethyl phenol, and (2) further reacting the first reaction product in the presence of an acidic alkylation catalyst with at least one-half mol of an olefin selected from the group consisting of isobutylene, tertiary amylenes and tertiary hexylenes.

The amount of olefin to be employed will depend upon the phenolic compound used and also upon the molar ratio of phenolic compound and dicyclopentadiene in the reaction product. Thus the product prepared from phenol and dicyclopentadiene will react with more of the olefinic compound than the product from p-cresol. Also, a reaction product of phenol containing a 2:1 molar ratio of phenol and dicyclopentadiene will react with more olefin than a 1:1 product. While products that are incompletely alkylated possess superior antioxidant properties compared to unalkylated products, preferred products are those in which alklyation is substantially complete. Preferred proportions of reactants in the final alkylation product are from 1.0 to 2.0 mols of tertiary olefinic mateial per mol of dicyclopentadiene when p-cesol, o-cresol, mixtures of m,p-cresol and p-ethyl phenol are reacted with dicyclopentadiene to produce the product of step one. The preferred proportions of reactants in the final alkylation poduct are from 2.0 to 4.0 mols of tertiary olefinic material per mol of dicyclopentadiene when phenol is reacted with dicyclopentadiene to produce the product of step one. A slight excess of the alkylating agent is generally employed to assure that the desired amount reacts with the product from stage one. The reaction products prepared in accordance with the above described procedure have been found to be much more effective as rubber antioxidants than the one step reaction products prepared by reacting dicyclopentadiene with phenolic materials the nucleus of which is already substituted with tertiary hydrocarbon groups.

The reaction between dicyclopentadiene and the phenolic compounds is effectively catalyzed by a Friedel-Crafts type catalyst, and in particular the more potent Friedel-Craft catalysts such as aluminum chloride, zinc chloride, ferrous and ferric chloride and boron trifluoride, as well as complexes based on boron trifluoride. Boron trifluoride and complexes based on boron trifluoride are preferred catalysts for the first step of the disclosed process. The second step of the above described two step reaction process, wherein the product obtained by reacting dicyclopentadiene and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the disclosed process. The catalysts employed in both the first and second stages of the disclosed process are employed in the customary catalytic amounts, which will normally vary from 0.1 percent to 5.0 percent of catalyst based on the total weight of the reactants in the reaction which is to be catalyzed.

While boron trifluoride will function as an alkylation catalyst to catalyze the second step of the disclosed process it is not a particularly desirable alkylation catalyst since it tends to promote undesirable side reactions. It is therefore preferred to remove the boron trifluoride catalyst when it is employed in the first step of the reaction before proceeding with the second or alkylation step of the disclosed process. The boron trifluoride catalyst may be effectively removed by destroying it with a basic material such as ammonia, or a solution of sodium hydroxide or sodium carbonate. Alternatively the boron trifluoride catalyst may be removed along with excess phenolic materials by heating the reaction mixture to a temperature from 100 to 160° C. under vacuum. An additional method of removing the boron trifluoride catalyst employed in the first step of the disclosed process is by refluxing the reaction mixture from step one with a small quantity of an inert organic solvent such as toluene at a temperature between 150 and 160° C. In either of the latter two methods the boron trifluoride may be recovered and subsequently reused in catalyzing the reaction of step one. The acidic alkylation catalyst employed to catalyze the second step of the disclosed process is normally neutralized with a suitable basic material such as a sodium carbonate solution.

The dicyclopentadiene is reacted with a phenolic compound at a temperature from 25 to 160° C. It is possible to conduct the reaction at slightly higher temperatures but care must be taken not to attain or exceed the decomposition temperature of the dicyclopentadiene which is in the neighborhood of 170° C. Preferred reaction temperatures are between 80 and 150° C. The reaction between dicyclopentadiene and a phenolic compound may be started at room temperature and since the reaction is quite rapid and exothermic the heat of reaction may be used to obtain the final reaction temperature. If adequate cooling facilities are available the reaction may be carried out on a continuous basis.

The molar ratio of phenolic compound to dicyclopentadiene employed in the reaction mixture of stage one of the disclosed process can be varied from 1:1 or 5 or more:1 mols of phenolic compound per mol of dicyclopentadiene. The proportions usually employed range from 2:1 to 4:1 mols of phenolic compound per mol of dicyclopentadiene, a preferred ratio being 3:1. The above preferred proportions of reactants provide for a substantial excess of the phenolic compound beyond that which will actually react with the dicyclopentadiene. The molar proportions of phenolic compound which reacts with dicyclopentadiene usually varies from 1:1 to 2:1 with the preferred molar ratio of reactants in the product obtained from step one of the disclosed process ranging from 1:50 to 1.75 mols of phenolic compound per mol of dicyclopentadiene. In some instances it may be desirable to carry out stage one of the disclosed process in an inert organic solvent such as benzene, toluene, etc. The employment of a solvent is particularly desirable if a relatively low ratio of phenolic compound to dicyclopentadiene is used. When the molar ratio of phenolic compound to dicyclopentadiene is 3 or more:1 the excess phenolic compound acts as an effective solvent and no additional solvent need be employed.

Step one of the present process may be carried out by adding the dicyclopentadiene to the mixture of phenolic compound and catalyst or the catalyst may be added gradually to the mixture of phenolic compound and dicyclopentadiene, the first of these two procedures is preferred. The rate at which the reactants are combined can vary over a wide range as long as the temperature is kept below 160° C.

The second step of the disclosed process involves alkylation of the product obtained in step one. In carrying out the second step of the process the resinous product obtained from step one is dissolved in an equal quantity of an inert hydrocarbon solvent such as benzene, toluene, etc. Alkylation is conducted at a temperature between 20 and 100° C. A preferred temperature range is between 60 and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however, the time within which the reaction is completed is dependent upon the activity of the alkylating agent used.

The chemical composition of the very complex reaction mixture consisting of rather high molecular weight molecules which is obtained by practicing the teachings of the present invention is incapable of being assigned an exact chemical formula. Furthermore, no pure compounds have been isolated from the reaction product. The applicant is therefore unable to assign a precise chemical formula to the resulting reaction mixtures or to define them in terms of standard chemical nomenclature.

In making the alkylated reaction products of this invention preferred phenolic materials are p-cresol and mixed m,p-cresol. The preferred olefin is isobutylene.

Representative examples of sulfur-containing compounds which may be used in the practice of the present invention are:

1-(butylthio)-heptanone-3
1-(cyclohexylthio)-hexanone-3
1-(3-methylphenylthio)-octanone-3
2-(3-methylphenylthio)-octanone-4
3-(phenylthio)-propanal
3-(hexylthio)-propanal
3-(phenyldithio)-hexanal
3-(cyclohexylthio)-butanal
3-(4-methylphenylthio)-octanal
octadecyl 3-(cyclohexylthio)-propanoate
dodecyl 3-(phenyldithio)-propanoate
3-(ethylthio)-propanoic acid Preferred sulfur containing compounds within the practice of the present invention are esters of thiodipropionic acid conforming to the following structural formula

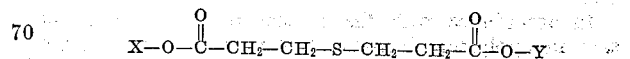

wherein X and Y are alkyl radicals containing from 1 to 20 carbon atoms. Most preferred are those containing from 8 to 18 carbon atoms.

Representative compounds conforming to the above structural formula are those where X and Y are as follows:

| X: | Y |
|---|---|
| methyl | ethyl |
| propyl | butyl |
| pentyl | hexyl |
| pentyl | heptyl |
| octyl | octadecyl |
| nonyl | hexadecyl |
| decyl | hexadecyl |
| monodecyl | pentadecyl |
| dodecyl | tetrahexyl |
| tridecyl | tetradecyl |
| octyl | octyl |
| nonyl | nonyl |
| dodecyl | dodecyl |
| monodecyl | monodecyl |
| dodecyl | dodecyl |
| tridecyl | tridecyl |
| tetradecyl | tetradecyl |
| pentadecyl | pentadecyl |
| hexadecyl | hexadecyl |
| heptadecyl | heptadecyl |
| octadecyl | octadecyl |
| 1-methyl propyl | 2-methyl propyl |
| 1-ethyl hexyl | 1-methyl heptyl |
| 1-ethyl hexyl | 1-ethyl-3-methyl pentyl |

Particularly representative are didodecyl-3,3′-thiodipropionate, ditridecyl-3,3′-thiodipropionate and dioctadecyl-3,3′-thiodipropionate.

The sulfur-containing compounds of this invention can be made according to any of the known methods described in the art.

Polymers that may be used in the practice of this invention are polystyrene, modified polystyrene and polymers of α-olefins having 2 to 8 carbon atoms in the molecule such as polyethylene and polypropylene.

The polystyrene may be made by any of a number of well known polymerization techniques such as suspension, bulk and emulsion polymerization.

The modified polystyrene is a homogeneous thermoplastic composition which is an interpolymer of natural or a synthetic rubber with styrene. The unvulcanized and unsaturated natural and synthetic rubbers include such polymers as natural pale crepe rubber, GR–S type rubber (copolymers of butadiene and styrene), synthetic Buna N type rubber (copolymers of butadiene and acrylonitrile), homopolymers of butadiene-1,3 and homopolymers of isoprene. The modified polystyrene may also be made by a number of well known procedures. It may be made by a bulk polymerization technique such as is described in U.S. Pat. 2,694,692 where a rubber is dissolved in styrene monomer and the solution is then polymerized to form a modified polystyrene. Another method involves the bulk polymerization of a rubber styrene solution until a given conversion is reached, e.g. 30 to 40 percent, followed by a suspension polymerization until the desired conversion is reached. Another method involves milling the rubber and polystyrene together. Various other methods are also known in the art.

The polyolefin polymers in accordance with the present invention are polymers of α-olefins having 2 to 8 carbon atoms in the molecule and may suitably be exemplified by polyethylene and polypropylene and the like. These polymers can be produced by polymerization of the corresponding olefins employing the Ziegler type polymerization catalyst which is obtained by at least partially reducing in solution in a diluent a halide of an amphoteric metal selected from Groups IV–B, V–B, VI–B and VIII of the periodic system of elements (see, for example, the Henry D. Hubbard Periodic Chart of the Elements, 1947 ed. revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride and the like. These polymers may also be made by any of the known procedures in addition to the one described above.

The practice of this invention is found particularly beneficial when applied to the stabilization of polypropylene and polyethylene. It is most particularly beneficial when applied to the stabilization of polypropylene.

The amount of the phenolic component to be used in the practice of the present invention may vary from about 0.001 part to about 0.50 part by weight per 100 parts of polymer. The sulfur containing compound to be used in the practice of the present invention may also vary from about 0.001 part to about 0.50 part by weight per 100 parts of polymer. The ratio of the phenolic component to the sulfur-containing compound may vary from about 10/1 to about 1/10. Amounts in excess of 0.50 part of each component may be used if desired, but amounts in excess of 0.50 part of each component in combination are normally not necessarily under ordinary conditions.

Polyethylene's ability to withstand degradation is greater than that of polypropylene, polystyrene or modified polystyrene and therefore require lower levels of stabilizer than these polymers require for an equivalent degree of protection against degradation.

The stabilizer system may be added by any of the conventional means used to add phenolic stabilizers to polymers. Where the polymer is a polyolefin which is in dry form the stabilizer may be added by conventional means such as mixing on an open mill or by internal mixing such as is accomplished in a Banbury mixer, or physical blending provided particle size is sufficiently reduced or by solvent deposition techniques.

The components of the stabilizer system may be added in any order, individually or in combination.

The following examples are illustrative of the preparation of the phenolic portion of the stabilizer system used in the practice of the present invention but are not intended as limitations on the scope of the invention.

EXAMPLE 1

Three hundred and thirty grams of p-cresol and 9.0 grams of a phenol BF₃ complex containing 26 percent BF₃ were heated to 100° C. and then 132 grams of dicyclopentadiene were added over a period of 3½ hours. The excess p-cresol was removed by heating to a column temperature of 150° C. at 4 mm., this procedure also removed the BF₃ catalyst. A residue of 316 grams was obtained.

Two hundred and thirty-six grams of this product were dissolved in an equal weight of toluene and 4.0 grams of H₂SO₄ added. The solution was heated to 80° C. and 168 grams of isobutene added over a period of 1¾ hours. The mixture was heated one hour longer then the catalyst was destroyed with a Na₂CO₃ solution. Volatiles and unreacted materials were removed by heating to 175° C. at 30 mm. Catalyst residues were removed by filtration. Weight of he product was 313 grams.

EXAMPLE 2

Three hundred and seventy-six grams of phenol and 9 grams of a phenol BF₃ complex containing 26 percent BF₃ were heated to 90° C. One hundred and thirty-two grams of dicyclopentadiene were then added in one hour between 90 and 107° C. The mixture was held at this temperature several hours longer. Then heated to 180° C. at 15 mm. to remove the BF₃ and unreacted phenol. A yield of 291 grams of a hard resin was obtained. The ratio of phenol to dicyclopentadiene was 1.69 to 1.

EXAMPLE 3

A 215 gram portion of the product from Example 2 was dissolved in 400 mls. of toluene. Six grams of concentrated $H_2SO_4$ were added. The mixture was heated to 55° C. and isobutylene added in 3½ hours or until no more was absorbed. The catalyst was destroyed with 12 grams of $Na_2CO_3$ dissolved in 50 mls. of $H_2O$. The volatiles were removed by heating to 150° C. at atmospheric pressure and then flashing off the remainder at the same temperature at 15 mm. Three hundred and nine grams of product were obtained.

EXAMPLE 4

One hundred and seventy-four grams of a reaction product of p-cresol and dicyclopentadiene prepared according to Example 1 were dissolved in 200 mls. of toluene and 6 grams of concentrated $H_2SO_4$ were then added to the solution. The solution was heated to 76° C. and 100 grams of 2-methyl-1-pentene in one hour. The mixture was held between 60 and 70° C. for six hours longer. The catalyst was destroyed with 40 grams of 25 percent $Na_2CO_3$ solution. The mixture was then heated to a final pot temperature of 150° C. at 15 mm. to remove volatiles. Two hundred and thirty-five grams of product were obtained.

EXAMPLE 6

Four hundred and one grams of p-ethyl phenol and 10 grams of a phenol $BF_3$ complex containing 26 percent $BF_3$ were heated to 84° C. and then 132 grams of dicyclopentadiene were added in 2½ hours time. The mixture was then heated to 190° C. (pot temperature) at 10 mm. to remove the $BF_3$ and the excess p-ethyl phenol. Yield of product was 331 grams. The molar ratio of p-ethyl phenol to dicyclopentadiene was 1.63 to 1.

EXAMPLE 6

Two hundred and thirty-seven grams of the product from Example 5 were dissolved in 250 mls. of toluene and 10 grams of concentrated $H_2SO_4$ were added to the solution. The mixture was heated to 65° C. and isobutylene added until no more would react. This took approximately three hours. Fifty grams of a 25 percent $Na_2CO_3$ solution were then added to destroy the catalyst and the whole mixture heated to 180° C. at 10 mm. to remove volatiles. Weight of the product was 301 grams.

EXAMPLE 7

Three hundred and twenty-four grams of a mixed m-p-cresol having a 3° boiling point range and 9 grams of a phenol $BF_3$ complex were heated to 80° C. and then 132 grams of dicyclopentadiene were added in two hours. The mixture was maintained at 80° C. and stirred one hour longer. The excess m-p-cresol and the $BF_3$ were then removed by heating to a pot temperature of 190° C. at 10 mm. Weight of the product was 294 grams. This represents a 1.5 to 1 molar ratio of m-p-cresol to dicyclopentadiene.

EXAMPLE 8

Two hundred and six grams of the reaction product from Example 7 were dissolved in 250 mls. of toluene and 10 grams of concentrated $H_2SO_4$ added to the solution. The mixture was heated to 63° C. and 150 grams of 2-methyl-1-butene were added in two hours. The mixture was held at 60° C. for four more hours. The catalyst was then destroyed and the volatiles removed as in previous examples. Yield of the product was 263 grams.

Various tests were run on polypropylene stabilized with the stabilizer system of the present invention. The same tests were run on unstabilized polypropylene and polypropylene stabilized with systems other than that of the present invention. In particular, yield tensile and melt indices were determined on oven aged and unaged polypropylene, both stabilized and unstabilized.

The polypropylene samples were prepared in the following manner. The phenolic compound was either dissolved in a suitable solvent such as hexane or acetone in a concentration of 1 to 5 percent and added to the polypropylene (Pro-Fax 6501) by dispersing the stabilizer solution in the powdered polypropylene using a Henschel blender and agitating at 2800 r.p.m. or by adding the phenolic compound directly to the polypropylene in the Henschel blender. The sulfur-containing compound was added to the polypropylene in the blender either directly or in solution. After 15 minutes the typical batch temperature approached 180° F. and a reasonable dispersion of the stabilizers was obtained. After 10 minutes only traces of the solvent remained where the stabilizers were added in solution. The stabilized polypropylene was then injection molded to prouce tensile bars, said tensile bars conforming to ASTM-D-638-64 T. The tensile bars were aged at 140° C. in a forced air oven. The stress-strain properties of the original and aged samples were measured by an Instron. A 4½ inch jaw was used, the jaw separation rate being 1 inch per minute.

Melt index determinations were made on the aged and unaged tensile bars which had been cut up into small pieces. The melt index test was run according to ASTM-D-1238-62 T, Condition L. As the polymer degrades the molecular weight is reduced by chain scission. The melt index indicates the molecular weight reduction and is expressed as grams of polymer extruded per unit time. As the molecular weight descreases due to degration, melt index increases.

The following Examples 11 and 13 are illustrative of the practice of the present invention but are not intended to so limit the invention.

EXAMPLES 9–11

A propylene polymer (Pro-Fax 6501) was stabilized according to the practice of the present invention (Example 11). Examples 9 and 10 are based on polypropylene polymer containing the individual components of the system used in Example 11. The samples were prepared, aged and tested as described earlier herein. Yield tensile and melt index data are listed in Table I.

TABLE I

| Stabilization system | Example 9 | | Example 10 | | Example 11 | |
|---|---|---|---|---|---|---|
| Butylated reaction product[1] of p-cresol and dicyclopentadiene (parts) | 0.05 | | | | 0.05 | |
| Dilaurylthiodipropionate (parts) | | | 0.25 | | 0.25 | |
| | A | B | A | B | A | B |
| Aging time, days: | | | | | | |
| 0 | 5,540 | 1.58 | 5,540 | 2.61 | 5,610 | 1.52 |
| 1 | 5,140 | 2.04 | 5,100 | 2.64 | 5,120 | 1.45 |
| 3 | 4,970 | 2.45 | 4,110 | 3.30 | 4,990 | 1.58 |
| 5 | 5,090 | 2.63 | (2) | (2) | 5,130 | 1.81 |
| 7 | 2,910 | (2) | | | 5,150 | 2.12 |
| 9 | 610 | | | | 5,050 | 2.16 |

[1] Prepared by a method according to Example 1.
[2] Failed.
NOTE.—A = Yield Tensile (p.s.i.); B = Melt Index, expressed as grams of polymer extruded per 10 minutes.

The above data demonstrate the improvement obtained in using a mixture of the present invention (Example 11) as opposed to the use of the components of the mixture individually (Examples 9 and 10). The yield tensile began to drop for the phenolic compound (Example 9) between the fifth and seventh day. The yield tensile began to drop for the thiodipropionate (Example 10) between the first and third day. The yield tensile for the mixture did not begin to drop for several days after the nine day period shown above. The combined effect was therefore greater than the additive effect of the individual components. The melt index for the mixture (Example 11) was also superior to the additive effect of the individual components.

EXAMPLES 12–13

A polypropylene polymer (Pro-Fax 6501) was stabilized according to the practice of this invention (Example 13). Example 12 is based on a polypropylene polymer (Pro-Fax 6501) stabilized with a phenolic/thiodipropionate mixture outside the scope of the present invention. The latter stabilization system was used at a level which was five times that of the level of the stabilization system used in Example 13. The samples were prepared, aged and tested as described earlier herein. Yield tensile data are listed in Table II.

TABLE II

| Stabilization system | Example 12 | Example 13 |
|---|---|---|
| 2,6-ditertiary-butyl p-cresol (parts) | 0.25 | |
| Butylated reaction product [1] of p-cresol and dicyclopentadiene (parts) | | 0.05 |
| Dilaurylthiodipropionate (parts) | 0.25 | 0.05 |

| Aging time, days: | Tensile (p.s.i.) | |
|---|---|---|
| 0 | 5,550 | 5,280 |
| 1 | 5,090 | 5,140 |
| 3 | 5,160 | 5,100 |
| 5 | 5,050 | 5,100 |
| 7 | 5,160 | 5,160 |
| 9 | 5,280 | 5,280 |
| 11 | 5,130 | 5,130 |
| 13 | 5,110 | 5,110 |
| 15 | 5,000 | 5,010 |
| 20 | | 5,140 |
| 25 | | 5,230 |
| 27 | Failed | |
| 30 | | 5,020 |
| 35 | | 4,150 |
| 39 | | 2,580 |

[1] Prepared by a method according to Example 1.

The above data demonstrate that a mixture of the present invention (Example 13) can be used at a level one-fifth of that of the level of a mixture of a commercially recognized phenol and a thiodipropionate (Example 12) and still provide superior stabilization. The time to yield tensile failure for the material protected by a mixture of the present invention was approximately 39 days, while the time to yield tensile failure for the material protected by five times the amount of the other mixture was 27 days.

The preceding examples demonstrate the effectiveness of the isobutylated reaction product of p-cresol and dicyclopentadiene with dilauryl-3,3'-thiodipropionate. Other phenolics within the scope of the present invention and made by the two step method (i.e., the reaction of the phenolic compound and dicyclopentadiene followed by the alkylation step) which are also effective within the practice of the present invention when used and tested in the same manner as the samples shown above are: isobutylated reaction product of phenol and dicyclopentadiene; isobutylated reaction product of o-cresol and dicyclopentadiene; isobutylated reaction product of mixed m-p-cresol and dicyclopentadiene; isobutylated reaction product of p-ethyl phenol and dicyclopentadiene; tertiary amylated reaction product of phenol and dicyclopentadiene; tertiary amylated reaction product of p-cresol and dicyclopentadiene; tertiary amylated reaction product of o-cresol and dicyclopentadiene; tertiary amylated reaction product of mixed m-p-cresol and dicyclopentadiene; tertiary amylated reaction product of p-ethyl phenol and dicyclopentadiene; tertiary hexylated reaction product of phenol and dicyclopentadiene; tertiary hexylated reaction product of p-cresol and dicyclopentadiene; tertiary hexylated reaction product of o-cresol and dicyclopentadiene; tertiary hexylated reaction product of mixed m-p-cresol and dicyclopentadiene; and the tertiary hexylated reaction product of p-ethyl phenol and dicyclopentadiene. Any of the isomers of the tertiary amylenes or hexylenes may be used.

Other sulfur-containing compounds within the scope of the present invention which are also effective when used and tested in the same manner as the samples shown above are those described by the structural formulae recited earlier herein.

The stabilizers of this invention are similarly effective in stabilizing modified polystyrene, polystyrene and polyethylene.

The data reveals that in the practice of the present invention extremely low amounts of certain phenolic stabilizers may be used to effectively stabilize polyolefins against oxidation degradation.

While certain representative embodiments and details have been shown for the purpose of illustrating the invention it will be apparent to those skilled in this art that various modifications and changes may be made therein without departing from the spirit or scope of the invention.

What is claimed is:

1. As a composition of matter a combination comprising (A) an alkylated reaction product wherein said product is formed by first reacting dicyclopentadiene with a phenol selected from the group consisting of phenol, p-cresol, o-cresol, mixed m-p-cresol and p-ethyl phenol to form a phenolic compound and then alkylating the phenolic compound with a tertiary olefin selected from the group consisting of isobutylene, tertiary amylenes, and tertiary hexylenes, and (B) a sulfur-containing compound conforming to the following structural formula:

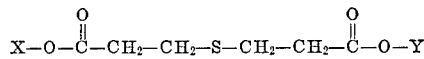

wherein X and Y are alkyl radicals containing 1 to 20 carbon atoms.

2. The composition of matter according to claim 1 wherein the alkylated reaction product is formed by (1) reacting in the presence of a Friedel-Craft type catalyst one mol of dicyclopentadiene and at least one mol of a phenolic material selected from the group consisting of phenol, p-cresol, o-cresol, mixed m-p-cresol and p-ethyl phenol and (2) further reacting the first reaction product in the presence of an acidic alkylation catalyst with at least one half mol of an olefin selected from the group consisting of isobutylene, tertiary amylenes and tertiary hexylenes.

3. The composition of matter according to claim 2 wherein the olefin is isobutylene.

4. The composition of matter according to claim 3 wherein the phenolic compound is p-cresol.

5. The composition of matter according to claim 3 wherein the phenolic compound is mixed m-p-cresol.

6. The composition of matter according to claim 4 wherein the sulfur-containing compound is dilaurylthiodipropionate.

7. The composition of matter according to claim 2 wherein X and Y are alkyl radicals containing 8 to 18 carbon atoms.

8. The composition of matter according to claim 7 wherein the sulfur-containing compound is selected from the group consisting of dilaurylthiodipropionate and distearylthiodipropionate.

9. The composition of matter according to claim 8 wherein the phenol is selected from the group consisting of phenol and p-cresol.

10. Polypropylene having incorporated therein the composition of matter according to claim 9.

11. A polymer selected from the group consisting of mono-olefin-derived polymers of mono-α-olefins having 2 to 8 carbon atoms in the molecule, polystyrene and interpolymers of unvulcanized and unsaturated natural or synthetic rubbers and styrene containing (A) an alkylated reaction product wherein said product is formed by first reacting dicyclopentadiene with a phenol selected from the group consisting of phenol, p-cresol, o-cresol, mixed m-p-cresol and p-ethyl phenol to form a phenolic compound and then alkylating the phenolic compound with a tertiary olefin selected from the group consisting of isobutylene, tertiary amylenes, and tertiary hexylenes, and (B) a sulfur-containing compound conforming to the following structural formula:

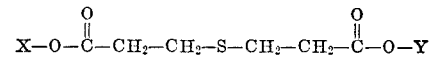

wherein X and Y are alkyl radicals containing 1 to 20 carbon atoms.

12. The polymer according to claim 11 wherein the alkylated reaction product is formed by (1) reacting in the presence of a Friedel-Craft type catalyst one mol of dicyclopentadiene and at least one mol of a phenolic material selected from the group consisting of phenol, p-cresol, o-cresol, mixed m-p-cresol and p-ethyl phenol and (2) further reacting the first reaction product in the presence of an acidic alkylation catalyst with at least one-half mol of an olefin selected from the group consisting of isobutylene, tertiary amylenes and tertiary hexylenes.

13. The polymer according to claim 9 wherein the polymers of α-olefins having 2 to 8 carbon atoms in the molecule are polyethylene and polypropylene.

14. The polymer according to claim 9 wherein the polymer is selected from the group consisting of polypropylene and polyethylene.

15. The polymer according to claim 9 wherein the polymer is polypropylene.

16. The polymer according to claim 15 wherein the olefin is isobutylene.

17. The polymer according to claim 16 wherein the phenolic compound is p-cresol.

18. The polymer according to claim 15 wherein the phenolic compound is mixed m-p-cresol.

19. The polymer according to claim 17 wherein the sulfur-containing compound is dilaurylthiodipropionate.

20. The polymer according to claim 11 wherein the alkylated reaction product is present in an amount of from 0.001 part to 0.50 part by weight per 100 parts of polymer, wherein the sulfur-containing compound is present in an amount of from 0.001 part to 0.50 part by weight per 100 parts of polymer and wherein the ratio of the alkylated reaction product to the sulfur-containing compound is from 10/1 to 1/10.

References Cited

UNITED STATES PATENTS

| | | | |
|---|---|---|---|
| 3,255,136 | 6/1966 | Hecker | 260—45.85 |
| 3,305,522 | 2/1967 | Spacht | 260—45.95 |

OTHER REFERENCES

Chemistry and Industry, periodical, Feb. 16, 1963, pp. 271 and 279 of article entitled "Antioxidants," by G. Scott.

Encyclopedia of Polymer Science and Technology, vol. 2, pp. 171 and 178 (1965), article entitled "Antioxidants."

DONALD E. CZAJA, Primary Examiner

V. P. HOKE, Assistant Examiner

U.S. Cl. X.R.

252—404; 260—45.95, 810, 814